United States Patent [19]

Tanaka

[11] Patent Number: 5,796,348

[45] Date of Patent: Aug. 18, 1998

[54] OVERLOAD PROTECTION DEVICE

[75] Inventor: Toshihiro Tanaka, 8-4, Umezu Fushihara-cho, Ukyo-ku, Kyoto-Shi, Kyoto-Fu, Japan

[73] Assignee: Toshihiro Tanaka, Kyoto, Japan

[21] Appl. No.: 759,621

[22] Filed: Dec. 5, 1996

[30] Foreign Application Priority Data

Dec. 18, 1995  [JP]  Japan ................... 7-014290

[51] Int. Cl.[6] ................................................ G08B 21/00
[52] U.S. Cl. .................... 340/666; 340/540; 340/668; 340/688
[58] Field of Search ........................ 340/666, 665, 340/668, 540, 688

[56] References Cited

U.S. PATENT DOCUMENTS 4,426,642  1/1984  Poffenbarger ................ 340/686
4,975,687  12/1990  Murphy, Jr. et al. ............ 340/688

FOREIGN PATENT DOCUMENTS 62-13992  7/1985  Japan.
1-179999  7/1988  Japan.
7-014290  12/1995  Japan.

*Primary Examiner*—Glen Swann
*Attorney, Agent, or Firm*—Ronald R. Snider

[57] ABSTRACT

This invention provides an overload protection device wherein a dangerous situation warning is given to workers in architectural construction when a load value imposed on a temporary column reaches a preset value. The device comprises a load pedestal above and a base pedestal below, a load detecting equipment which detects the load value on the load pedestal after converting the load value into a hydraulic pressure value, a pressure detecting equipment which operates when the pressure reaches the preset value, and a notice equipment which informs workers that the load value imposed on the temporary column has reached the preset value.

8 Claims, 5 Drawing Sheets

OVERLOAD PROTECTION DEVICE

BACKGROUND OF THE INVENTION

In prior art, concrete supplying process for construction work of concrete architecture is usually performed through procedures as explained in attached FIGS. 5, 6, and 7.

With reference to FIG. 5, a temporary column is used for the construction work, while FIG. 6 shows a perspective view of main portions of the temporary column. In these figures, the numeral 21 is a form work to receive concrete supply and the numeral 21a is bottom surface of the form work (21), while the numeral 22 indicates floor for concrete building. The numeral 23 is the temporary column having a mount plate (23a) on both ends, and these two plates (23a) are formed in same shape and are equipped with same pitched holes for coupling.

Toward an upper side of the mount plate (23a), a first branch pipe (23b) is established, while toward a lower side of the mount plate (23a'), a second branch pipe (23c) is similarly established. With reference to FIG. 6, plural pairs of holes (23d) are drilled through toward the lower portion of the first branch pipe (23b) at some distance therebetween. The second branch pipe (23c) comprises a pipe body (23e) coupling with the mount plate (23a), a screwing pipe (23h) having a male screw portion (23f) and a pair of holes (23g) above the portion (23f) to align with the pair of holes (23d), and a pin (23i) to run through both holes (23g and 23d) after their alignment. On one end of the pipe body (23e) upward, an adjusting pipe (23k) equipped with a handle (23j) is built, having a female screw in its inner circumference corresponding with the male screw portion (23f).

In order to place the temporary column (23) correctly between the form work (21) and the floor (22), the first branch pipe (23b) is inserted into the second branch pipe (23c), and the length of the temporary column (23) is decided so that the two mount plates (23a) might be contacted on the bottom surface (21a) of the form work (21) above and on the floor (22) below. The pin (23i) is inserted into the hole (23d) of the first branch pipe (23b) and the hole (23g) of the screw pipe (23h) after alignment, and thus the first branch pipe (23b) and the second branch pipe (23c) are fixed together. Then, the handle (23j) is manually operated to rotate the adjusting pipe (23k), whereas the screw pipe (23h) is moved up and down to find the proper place where the two mount plates (23a) contact on the bottom surface (21a) above and on the floor (22) below to support the temporary column (23).

According to FIG. 5, a wooden bar (24) is used between the mount plate (23a) and the bottom surface (21a) of the form work (21), so that it ensures the tight and elastic contact thereon.

With reference to FIG. 7, an example of using the temporary column (23) in piping construction is shown. The numeral 25 is a ditch wherein the piping construction is taken. The numeral 25a is a side wall to hold the temporary column (23), and the numeral 26 is a poling board against the side wall (25a), while the numeral 27 shows a piping.

In this piping construction, the poling board (26) is installed against the side wall (25a) to prevent the falling down of the side wall (25a) in the ditch because of groundwater invasion. In this case, the temporal column (23) is furnished between both side walls (25a) via the bar (24), and after this furnishing the piping construction work is started.

With regard to the temporary support columns in the prior art as explained above, the safety load limit should have been recognized and predetermined as an important factor. However, in the present situation, the quantity of concrete supplied into the form work is mainly decided by adjusting the concrete mixer or by experienced skill of the worker. Where there are a plurality of temporary columns, the load value is imposed differently on each column. Sometimes, a concrete quantity exceeding the safety load is supplied into the form work. This may result in some very dangerous conditions. For example, during construction of a gymnasium, when the concrete was supplied into the form work at ceiling portion, some of the temporary columns are broken by overload. This caused a chain reaction where other columns were broken one after another and finally the ceiling under construction fell down to the floor, which injured workers who were working on the floor.

In another case, during construction of piping in the ground, the side wall fell down over the workers when the temporary column was removed. This landslide caused workers to suffocate to death. The side wall was supported by the poling board and the temporal column, and therefore it is not clearly expected that the landslide would be caused by invasion of groundwater until the temporal column was removed.

In order to improve this dangerous work environment in the architectural industry, it is needed to develop an overload protection or warning device to recognize such a danger when using temporary columns.

SUMMARY OF THE INVENTION

This invention has as its object to develop and provide an overload protection and warning device wherein the device informs workers of approaching danger when a dangerous value preset in the device is reached in the architectural workings.

The present invention has another object, to provide an overload protection device wherein safe working conditions can be maintained and danger can be avoided.

This invention is an overload protection and warning device which detects and informs workers that the load value imposed on the temporary column has reached its predetermined limit. The device has a load pedestal on its top while it has a corresponding base pedestal on its bottom. A load detector is coupled with said pedestal where the imposed load value in the pedestal is changed into pressure value. A pressure detector is established and it is operated when the pressure value reaches a preset value as soon as the value is obtained. A notice equipment means for informing is also provided. The pressure detecting equipment conveys the fact that the preset value (preterminded limit) by operating to close an electric circuit. Finally, the notice equipment informs or warns workers that the imposed value on the temporal column has reached the preset value.

This invention also has adopted a hydraulic cylinder as a load detector wherein the load value is changed into oil pressure. A pressure switch is adopted as a pressure gauge, while an alarm lamp and/or a alarm buzzer are adopted as a notice equipment or means for informing or warning.

DETAILED DESCRIPTION OF PREFERRED EMBODIMENT

With reference to FIG. 1–FIG. 4, preferred embodiment is now explained.

Figure 5:
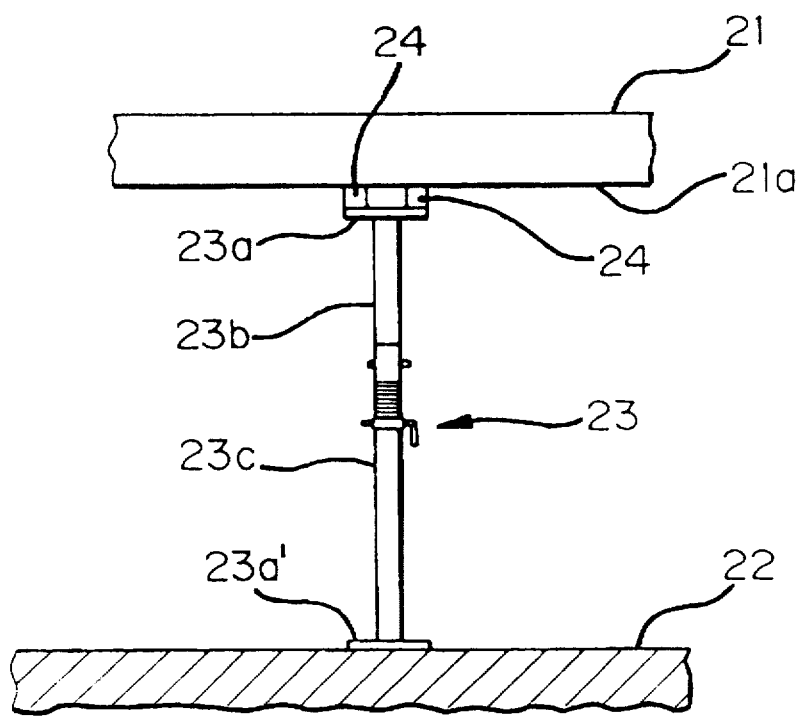
FIG. 5 is an explanatory view in prior art to show how to set a temporary column.
Figure 6:
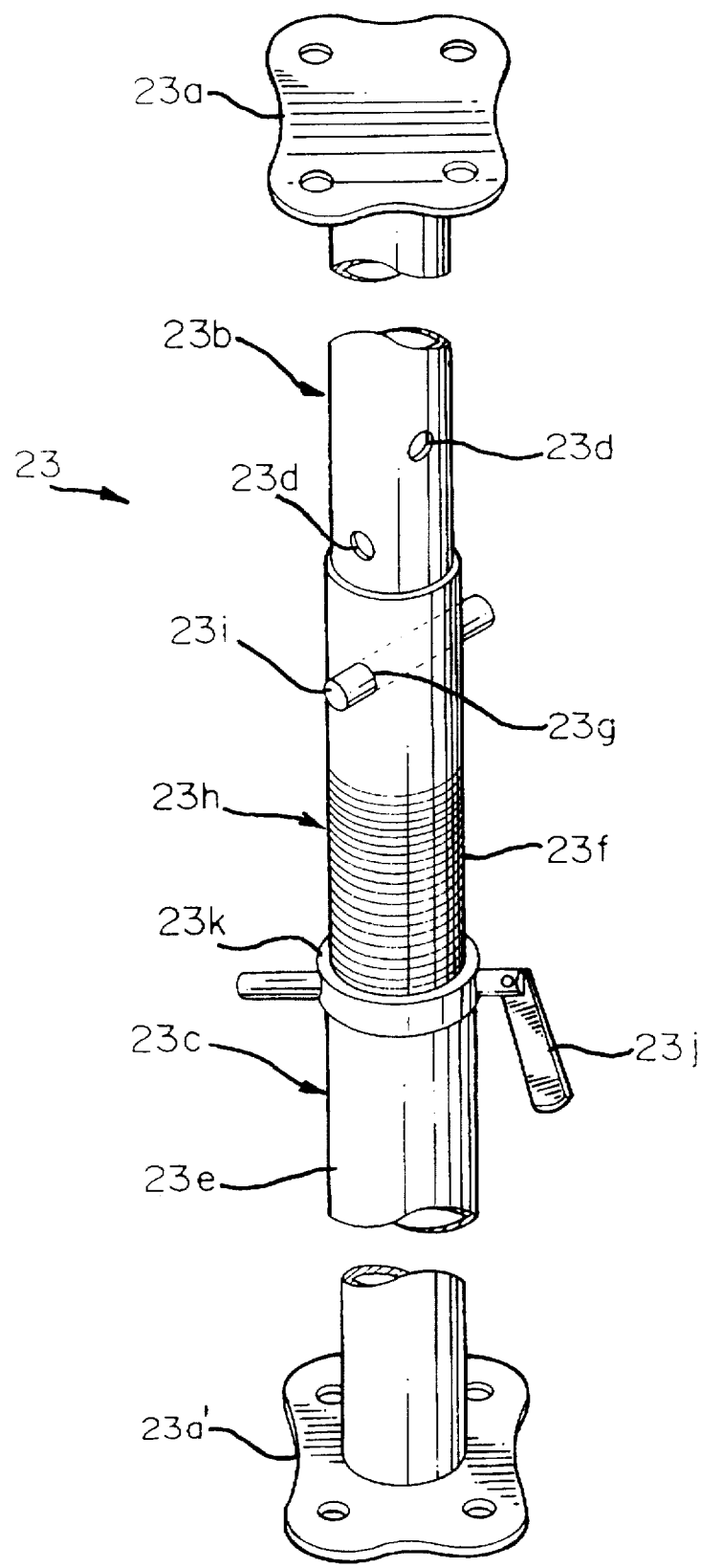
FIG. 6 is a partially perspective view in prior art for a temporary column.

The numeral 1 shows an overload protection device developed by the invention, whereby load value imposed on a temporary column (23) is detected and transmitted. On the upper portion of the overload protection device a load pedestal (2) is formed, while on the lower portion another base pedestal (3) is formed. Two pieces of mount plates (23a,23a') are coupled on the upper and lower portions of the temporal column respectively (FIG. 5). Plural pieces of a setting hole (2a) are drilled in the load pedestal (2) in the same size and pitch with a hole of the mount plate (23a,23a') so that the load pedestal (2) may be coupled and fixed to each of the mount plate (23a,23a'), while, in the similar manners, plural setting holes (3a) are drilled in the base pedestal (3). Beneath the load pedestal (2) in the central portion, a concave connecting portion (2b) is formed, and a piston rod (4a) of a hydraulic cylinder (4) is inserted and attached to the connecting portion (2b). The hydraulic cylinder changes the load value imposed on the load pedestal (2) into oil pressure. Thus the load pedestal (2) is connected with the hydraulic cylinder (4). The hydraulic cylinder (4) is held and fixed by a bottom body (1a) in a oblong shape which is established as one body of the base pedestal (3). On one side toward lower direction of the hydraulic cylinder (4), a guide pipe (5) in the L-letter shape is prepared and it is connected with a pressure switch (6) which starts to operate when the oil pressure caused by the hydraulic cylinder (4) reaches the preset value. On the other side of the hydraulic cylinder (4), another guide pipe (7) in the L-letter shape is prepared and it is connected with a load value indicator (8) which shows the oil pressure as the load value changed by the hydraulic cylinder (4).

Figure 1:
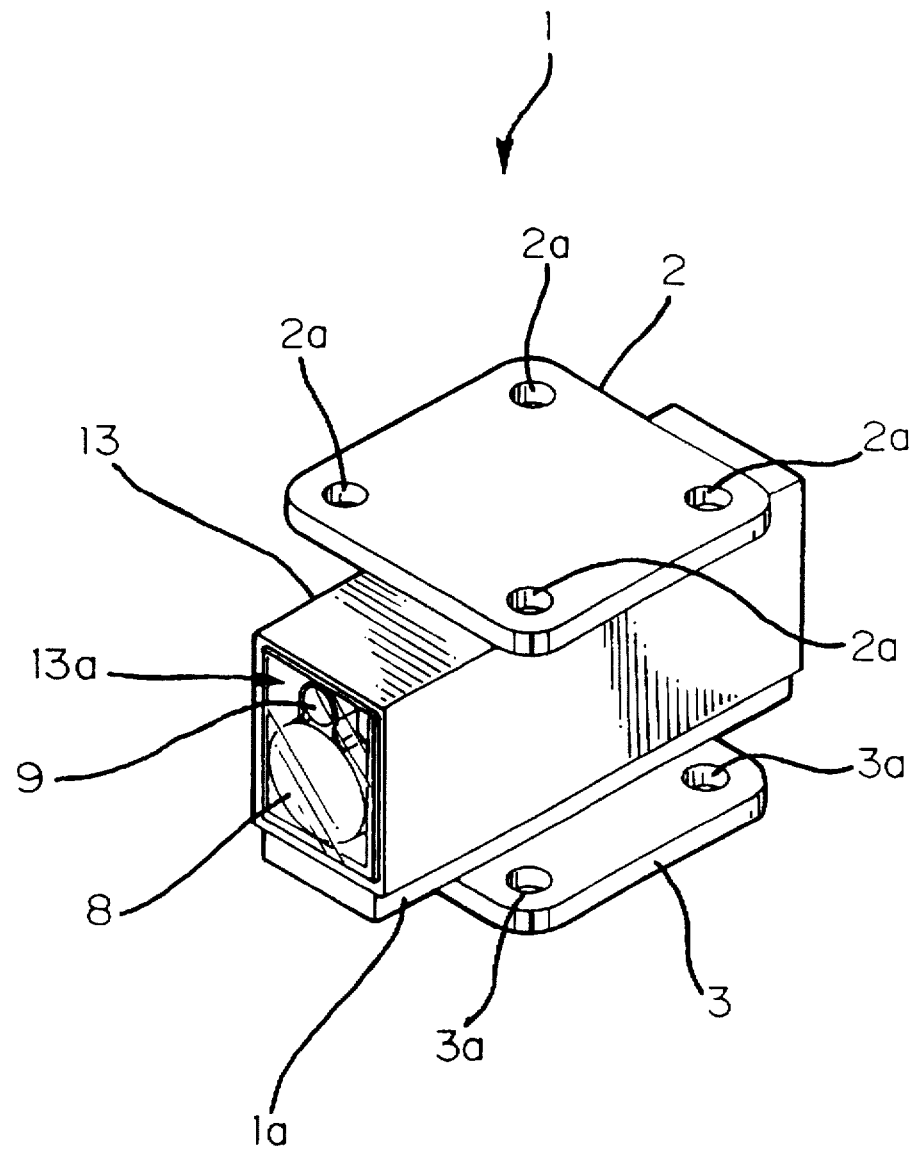
FIG. 1 is a perspective view of a overload protection device developed by this invention.
Figure 2:
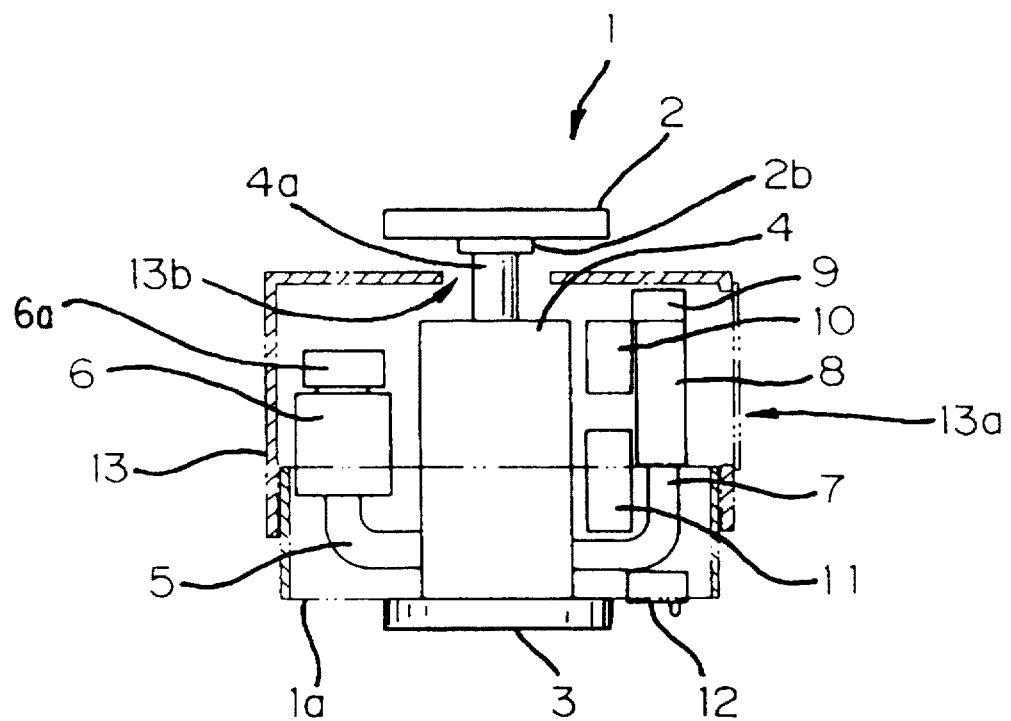
FIG. 2 is a side view showing the inner components of the device.
Figure 3:
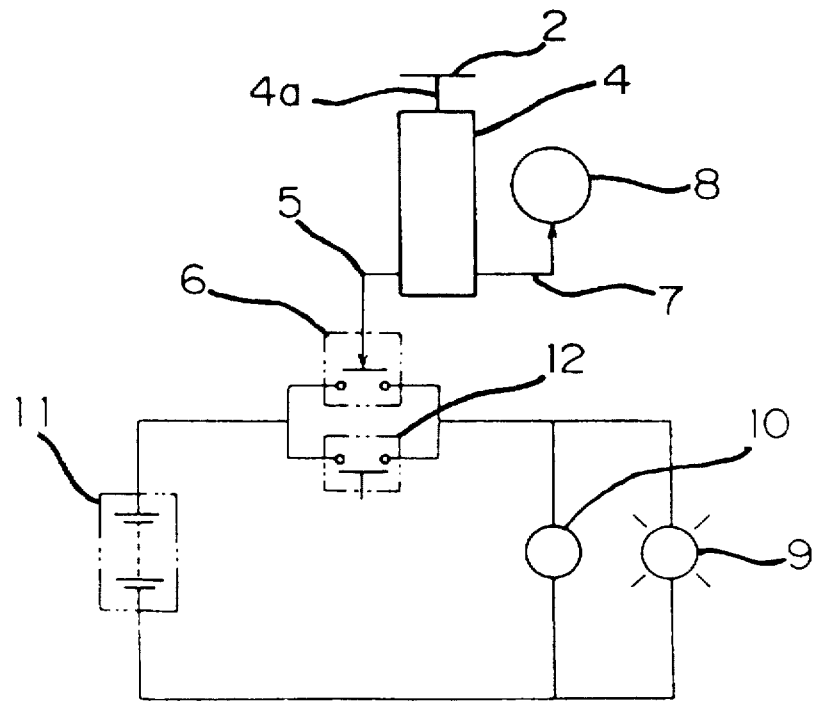
FIG. 3 is a wiring diagram of the device.

The numeral 9 is an alarm lamp which functions as a notice equipment where it warns the load value imposed on the temporary column (23) has reached the preset value, while the numeral 10 is an alarm buzzer which fulfills the same function as the alarm lamp (9). The numeral 11 is an electric supply and the numeral 12 is a test switch. As shown in FIG. 3, the pressure switch (6) and the test switch (12) are connected in parallel circuit, and at the same time, the alarm lamp (9) and the alarm buzzer (10) are also connected in parallel. These switches and alarms are connected in series with the electric supply (11).

A window (13a), by which the display board of the load indicator (8) and the alarm lamp (9) can be visually confirmed, is prepared on the side of the hydraulic cylinder (4). A lid body (13) in oblong shape is prepared and in its top portion it has a mouth (13b) through which the concave connecting portion (2b) of the load pedestal (2) can freely run. Finally the lid (13) is covered over with the bottom body (1a). Thus, in the overload protection device, the hydraulic cylinder (4), the pressure switch (6), the load indicator (8), the alarm lamp (9), the alarm buzzer (10), the electric supply (11) and the test switch (12) are correctly installed, while over the lid body (13) the load pedestal (2) coupled with the piston rod (4a) of the hydraulic cylinder (4) is located in relative connection with the base pedestal (3) at the bottom body (1a).

Now, actual setting of the overload protection device (1) is explained. Before connecting the overload protection device (1) with the temporary column (23), the operation of the test switch (12) should be confirmed whether it works correctly to obtain the lighting of the alarm lamp (9) and the sound of the alarm buzzer (10).

Figure 4:
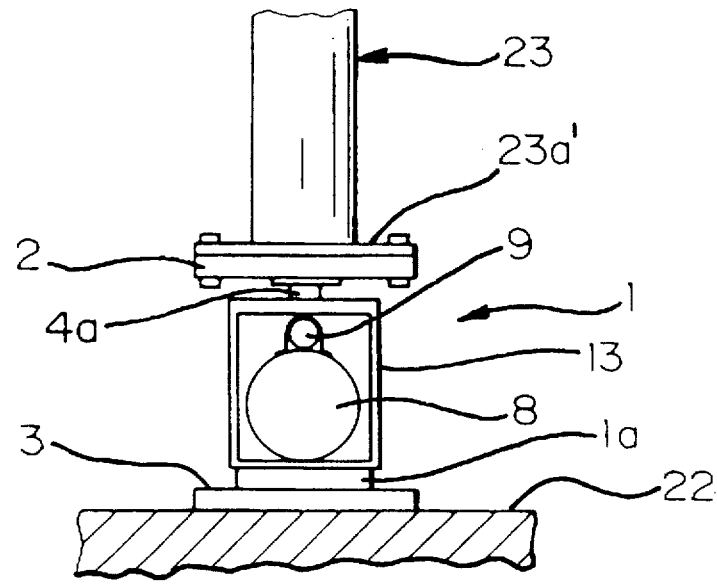
FIG. 4 is an explanatory view to show how to install the device.

With reference to FIG. 4, the lower mount plate (23a') of the temporal column (23) is firmly clamped with the load pedestal (2) of the overload protection device (1) by bolts.

In order to support a form plate (21) with the temporary column (23), as shown in FIG. 5, the length of the temporary column (23) is properly adjusted so that the upper mount plate (23a) may contact on a wooden bar (24) located on a bottom surface (21a) of the form plate (21), and a hole (23d) of a first branch pipe (23b) is registered to a hole (23g) of a screwing pipe (23h) wherein a pin (23i) is inserted so that the first branch pipe (23b) and a second branch pipe (23c) are fixedly connected. Then, an adjusting pipe (23k) is rotated by a handle (23j) operation to move the screwing pipe (23h) up and down. By this movement, the upper mount plate (23a) of the temporary column (23) is to be contacted on the wooden bar (24) while the base pedestal (3) of the overload protection device (1) is to be contacted on a floor (22). Thus the temporary column (23) is stably fixed between the bottom surface (21a) of the form plate (21) and the floor (22).

Now, it is explained how to operate the overload protection device (1). When concrete is supplied into the form plate (21) the load is imposed on the temporary column (23), and this load is conveyed to the load pedestal (2) of the overload protection device (1) connected to the temporary column (23), and then a piston rod (4a) is pushed down to cause oil pressure whereon this oil pressure is conveyed to a load indicator (8) and to a pressure switch (6) via the two guide pipes (5) (7). The load indicator (8) displays the imposed load value while the pressure switch (6) is starting to operate when the oil pressure caused by the hydraulic cylinder (4) reaches to the preset value. The operation of the pressure switch (6) is to close the electric circuit so that the alarm lamp (9) is put on and the alarm buzzer is sounded. This alarm notices workers that the load exceeds the preset value.

The preferred embodiment is so far explained, and at this stage further and detailed explanations are now submitted for constitution elements.

With regard to a temporary column, it is not necessary to adopt a special one at all, and therefore a general column sold in the market can be adopted.

In order to connect the present overload protection device with a general column, it is only required to form a setting hole on a load pedestal or a base pedestal, the hole being correspond with a setting hole of the general column, and thus the mount plate of the column is stably fixed by bolts with either the load pedestal or the base pedestal of the device. In this case, the device can be connected with the upper mount plate or lower mount plate. Further, in case if plural columns are connected together for the construction, this device can be set just between the two columns.

Figure 7:
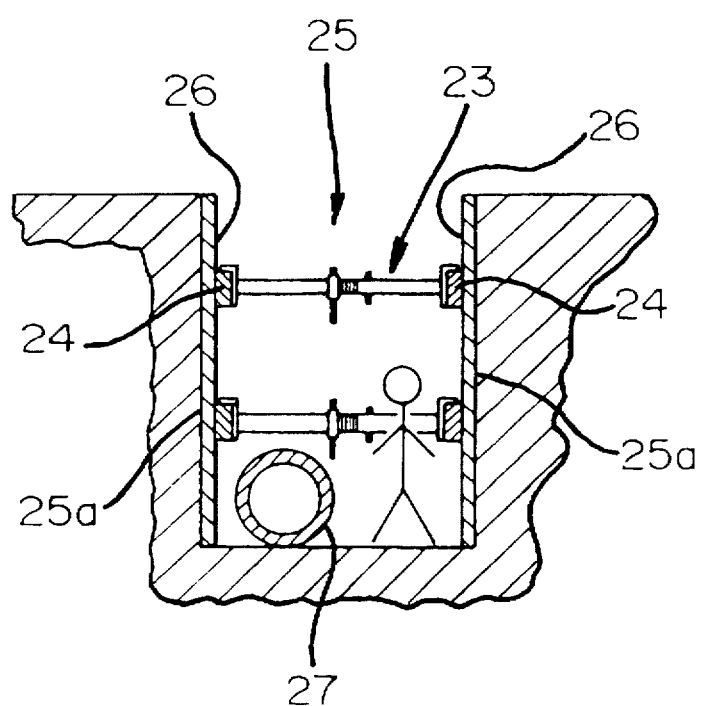
FIG. 7 is an explanatory view in prior art for a temporary column used in piping construction.

Concerning the shape and hole pitch of the mount plate for the temporary column used in construction work of concrete architecture, some standards are adopted thereof, and accordingly the load pedestal or base pedestal for the overload protection device may be arranged in advance to meet those standards. In case if this device is used for the underground piping construction, with reference to FIG. 7, either the load pedestal or base pedestal is attached to the wooden bar by bolts or nails and the rest pedestal is also attached to the mount plate of the temporary column for fixing confirmation.

As a another method to connect the device with the column, plural numbers of a hook shaped claw portion is established on the load pedestal or base pedestal, and this claw portion is to catch the mount plate of the temporary column therebetween for firm coupling. When this method is adopted, the coupling of the device can be made within a short time of it.

As an equipment to detect the load value, it is available to adopt any kind of the equipment which can change the load value into pressure value. In case if some hydraulic cylinder is adopted, the cylinder can be supplied in considerable down sizing to endure 10 tons load.

As an equipment to detect the pressure, it is available to adopt any kind of the equipment wherein the pressure value can be preset and a built-in switch is installed to start its operation when the preset value is obtained.

As a notice equipment, an alarm lamp or an alarm buzzer may be adopted, but it is preferable to prepare plural equipment together so that the expected danger can be notified to the workers by plural means for safety.

As an electric supply, a storage battery or an electric cell battery is adopted.

In this invention, a test switch is adopted, but in case if the device is directly connected with an electric supply just before the use, this test switch is not necessary at all since the electric supply can be confirmed beforehand. However, in case if the electric supply is built in the device, it is preferable to prepare the switch whether the electric supply is correctly obtained or not before use or reuse.

A load indicator shows the load value, and through watching the indicator any change or increase of the value can be recognized in the course.

Now an example of actual embodiment is explained.

A load pedestal (2) is provided from aluminum material with a size of 140 mm high×140 mm long×10 mm thick in the square shape. Toward each 4 corners a setting hole (2a) is drilled to connect with a temporary column (23). Beneath the load pedestal (3) at the central portion a concave connecting portion (2b) is formed at the size of 50 mm outer diameter×30 mm inner diameter×20 mm high having a caulking hole with a size of 6.5 mm.

A base pedestal (3) is also provided in the same material and in the same size as the above load pedestal (2), and at each 4 corners a setting hole (3a) is drilled to connect with the temporary column (23). On this pedestal (3) 4 setting holes (not shown in the drawing) are drilled to connect properly with a hydraulic cylinder (4). The size of plural setting holes (2a and 3a) to be used for both pedestals (2 and 3) is exactly same.

A lid body (13) without bottom is provided from 2 mm aluminum plate with a size of 180 mm long×75 mm broad× 110 mm high. A mouth (13b) having 55 mm diameter is formed on the top of the lid body (13) in the central portion, and on one long side of the body (13) a window (13a) with a size of 80 mm long×59 mm broad is formed. The window (13a) is covered with a transparent carbonate plate with 3 mm thickness. On both short sides of the body (13) toward its lower portion three pieces of screw holes (not shown in the drawing) are formed at the fixed space.

A bottom body (1a) without lid and bottom opened is also provided from 2 mm aluminum plate with a size of 175 mm long×65 mm broad×50 mm high. In the distance at 20 mm from the top of the bottom body (1a) three screw holes (not shown in the drawing) are formed, and these holes are corresponding with said holes of the lid body (13), whereon the bottom body (1a) is properly inserted into the lid body (13).

The bottom body (1a) is now located on the middle of the bottom pedestal (3) so that the setting hole (3a) of the pedestal (3) may comes out, then the bottom body (1a) is now welded onto the pedestal (3).

A hydraulic cylinder (4) is endurable at 10 tons load.

A pressure switch (6) is adopted for a piston type switch equipped with its scope under 60–1000 kgf/cm².

An alarm lamp (9) and an alarm buzzer (10) are adopted for some normal types sold in the market.

An electric supply (11) is a 6V lithium battery.

A test switch (12) is a normal type sold in the market, while a pressure gauge equipped with 0–1000 kgf/cm² is now adopted as a load indicator (8).

The pressure switch (6) and the pressure gauge (8) are now connected with the hydraulic cylinder (4) via two guide pipes (5 and 7), and the cylinder (4) is now coupled by a screw through the setting hole with the base pedestal (3) which is jointed with the bottom body (1a). According to FIG. 3, the alarm lamp (9), the alarm buzzer (10), the test switch (12), the pressure switch (6) and the lithium battery (11) are wired by an electric circuit, while the alarm lamp (9) is fixed over the pressure gauge (8) by a bracket and the test switch (12) is screwed in the inside of the bottom body (1a).

A hand of the pressure switch (6) is set to 2-ton after rotating the cap (6a) of the switch (6), and the test switch (12) is confirmed to operate correctly. Then, the head of the piston rod (4a) of the cylinder (4) is extended through the mouth (13b) of the lid body (13), and the lid body (13) is covered over with the bottom body (1a) where the screw holes of the bottom body (1a) are registered with those of the lid body (13) for screwed fixing. In succession, the head of the piston rod (4a) is inserted into the concave connecting portion (2b) of the load pedestal (2), and the piston rod (4a) and the load pedestal (2) are firmly fixed by a screw fastening. Thus, the overload protection device is now prepared for accepting the temporary column (23).

As shown in FIG. 4, the device (1) presetting the load at 2 tons is now coupled with the lower mount plate (23a') of the temporary column (23) supporting a form work (21) above. Concrete is now supplied onto the form work (21). When the alarm lamp (9) lights and the alarm buzzer (10) rings, the concrete supply is stopped. At this stoppage time, the hand of the pressure gauge (8) indicates the 2-ton pressure correctly.

As explained so far, by the adoption of the present device, when the dangerous situation which is preset in the device is approaching, the fact is informed to actual workers in the architectural buildings. Therefore, the workers on the actual spot can proceed and continue their jobs with safety when there is no alarm transmit. Whereas the work, environment becomes dangerous the work can stop. This provides improved safety in the 1 industry.

It is further understood by those skilled in the art that the foregoing description is a preferred embodiment of the disclosed device and that various changes and modifications may be made in the invention without departing from the spirit and scope thereof.

The present disclosure relates to subject matter contained in Japanese Patent Application Number 7-14290 (filed on Dec. 18, 1995) which is expressly incorporated herein by reference in its entirety.

What is claimed is:

1. An overload protection and warning device having two pedestals on its ends equipped with a detecting and overload informing or warning means for a load value exceeding a predetermined amount on a temporary column to be used in architectural construction, comprising:

a load pedestal formed above and a base pedestal formed below said overload protection device;

a load detector coupled to the load pedestal for changing column load value into a pressure value;

a pressure detector responsive to a preset value of the pressure value which is in advance set in the pressure detector; and a means for informing or warning that imposed load value on the temporary column has reached to a preset value through movement of the pressure detecting equipment which closes an electric circuit.

2. A device according to claim 1, wherein the load detector is a hydraulic cylinder which converts the load value into an oil pressure value, the pressure detector is a pressure switch, and the means for informing is an audible alarm.

3. A device according to claim 2, wherein the means for informing also comprises an alarm lamp.

4. A device according to claim 1, wherein the means for informing is an alarm lamp.

5. A device according to claim 1, wherein setting holes are drilled on both the load pedestal and the base pedestal, the setting holes corresponding to those of a mount plate of the temporary column, so that the mount plate, is fixedly bolted with the load pedestal or the base pedestal and the device can be coupled with the temporary column.

6. A device according to claim 1, wherein a storage battery or an electric cell battery is adopted as an electric supply and is built into the device.

7. A device according to claim 1, wherein said overload protection and warning device senses overloading of the column load value.

8. A device according to claim 1, wherein said preset value of the pressure value is set in accordance with a value which is determined to overload the load carrying capacity of the temporary column.

* * * * *